Nov. 13, 1956 R. I. ROTH 2,770,798
METHODS AND APPARATUS FOR MEASURING ANGULAR MOVEMENT
Filed Nov. 24, 1953 3 Sheets-Sheet 1

FIG. I.

INVENTOR.
ROBERT I. ROTH
BY
Campbell, Brumbaugh, Free + Graves
his ATTORNEYS

Nov. 13, 1956     R. I. ROTH     2,770,798

METHODS AND APPARATUS FOR MEASURING ANGULAR MOVEMENT

Filed Nov. 24, 1953     3 Sheets-Sheet 2

*INVENTOR.*
ROBERT I. ROTH

BY

Campbell, Brumbaugh, Free & Graves
his ATTORNEYS

Nov. 13, 1956  R. I. ROTH  2,770,798
METHODS AND APPARATUS FOR MEASURING ANGULAR MOVEMENT
Filed Nov. 24, 1953 3 Sheets-Sheet 3
FIG. 4.
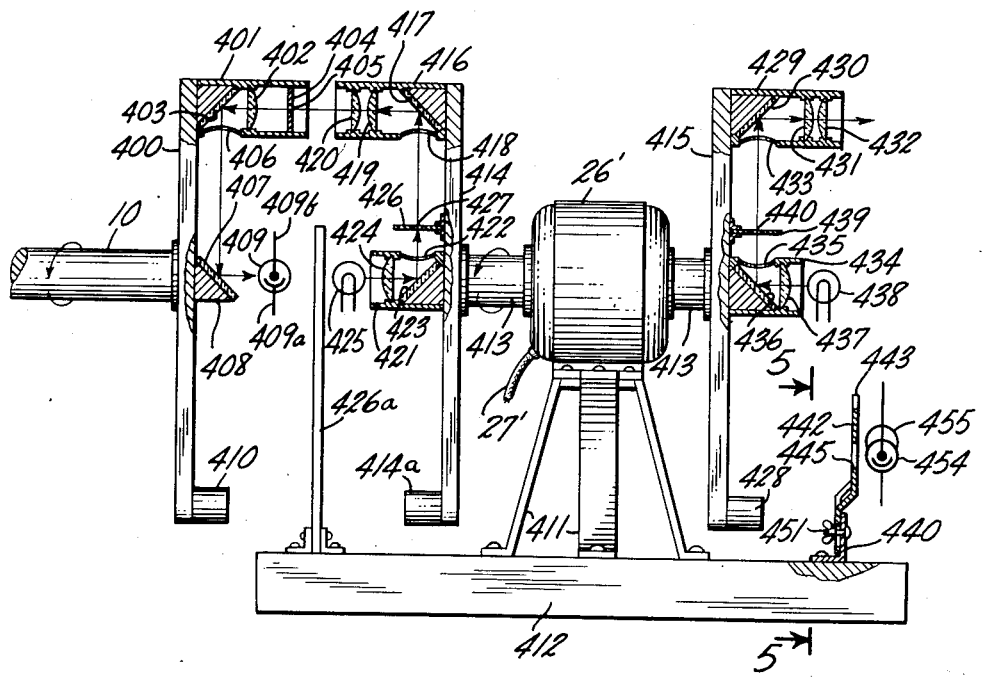
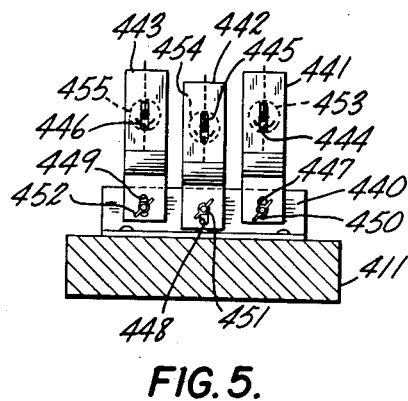
FIG. 5.
INVENTOR.
ROBERT I. ROTH
BY
Campbell, Brumbaugh, Free & Graves
his ATTORNEYS United States Patent Office 2,770,798
Patented Nov. 13, 1956

2,770,798

METHODS AND APPARATUS FOR MEASURING ANGULAR MOVEMENT

Robert I. Roth, Mount Pleasant, N. Y., assignor to International Business Machines Corporation, New York, N. Y., a corporation of New York Application November 24, 1953, Serial No. 393,976

18 Claims. (Cl. 340—206)

This invention relates to methods and apparatus for translating increments of angular motion to digital form and has particular reference to such methods and apparatus for accurately determining and measuring the angular position of a shaft rotating less than 360°.

It is desirable in many instances to accurately determine the angular position of a shaft with reference to a zero position. Previous systems for accomplishing this function have relied primarily on mechanical indicators directly or indirectly connected to the rotating shaft. In order to attain greater accuracy and speed of observation, it would be advantageous to translate the angular movement of a shaft to digital form and, accordingly, it is a primary object of this invention to provide an analogue to digital converter for indicating the angular position of a shaft rotating less than 360°.

Another object of the invention is to provide information in digital form which is representative of the movement of a rotating shaft from a zero position.

A further object of the invention is to provide digital information indicating the position of a shaft rotating less than 360° by providing reference means mechanically coupled thereto and scanned by means for generating spaced pulses representative of the position of the reference means, and utilization means energized by the spaced pulses for providing such information.

Yet another object of the invention is to provide apparatus for obtaining digital information indicating the position of a shaft rotating less than 360° and means for displaying such information.

Still a further object of the invention is to provide apparatus for obtaining digital information representative of the position of a rotating shaft and means for permanently recording such information.

These and further objects of the invention are accomplished by providing a unit on a shaft subject to angular movements. Rotating means driven at a speed determined by signal generating means are provided for repeatedly scanning the unit and generating pulses indicative of its angular position. These pulses are employed to control gating means selectively coupling the signal generating means to a counting device, the number of signals received being indicative of the angular movement of the unit from a zero position. Reading out means associated with the counting device display the digital information found therein.

The reading out means, selectively energized in response to further pulses generated as the rotating means scans fixed elements, may include relays actuated according to the digital information. The relays may in turn, control display means and/or recording means for translating the digital information to visual form.

In one embodiment of the invention, the unit joined to the rotating shaft may include a pickup coil for generating control pulses in response to scanning by magnetic field generating means mounted on the rotating means. The fixed elements may consist of further coils having predetermined angular relations to the pickup coil with the shaft at the zero position, such coils generating further control pulses in response to rotation of the magnetic field generating means.

In another embodiment of the invention, the unit may comprise light transmitting means associated with a light responsive device for producing control pulses in response to light generating means associated with the rotating means. Such light generating means may also cooperate with the rotating means to energize further light responsive means for providing additional control pulses.

These and further objects and advantages of the invention will be more readily understood when the following description is read in connection with the accompanying drawings in which:

Figure 4 is a view in elevation of apparatus for producing control pulses that may be substituted for the corresponding apparatus illustrated in Figure 1; and Figure 5 is a fragmentary view taken on the view line 5—5 of Figure 4 looking in the direction of the arrows.

Figure 1:
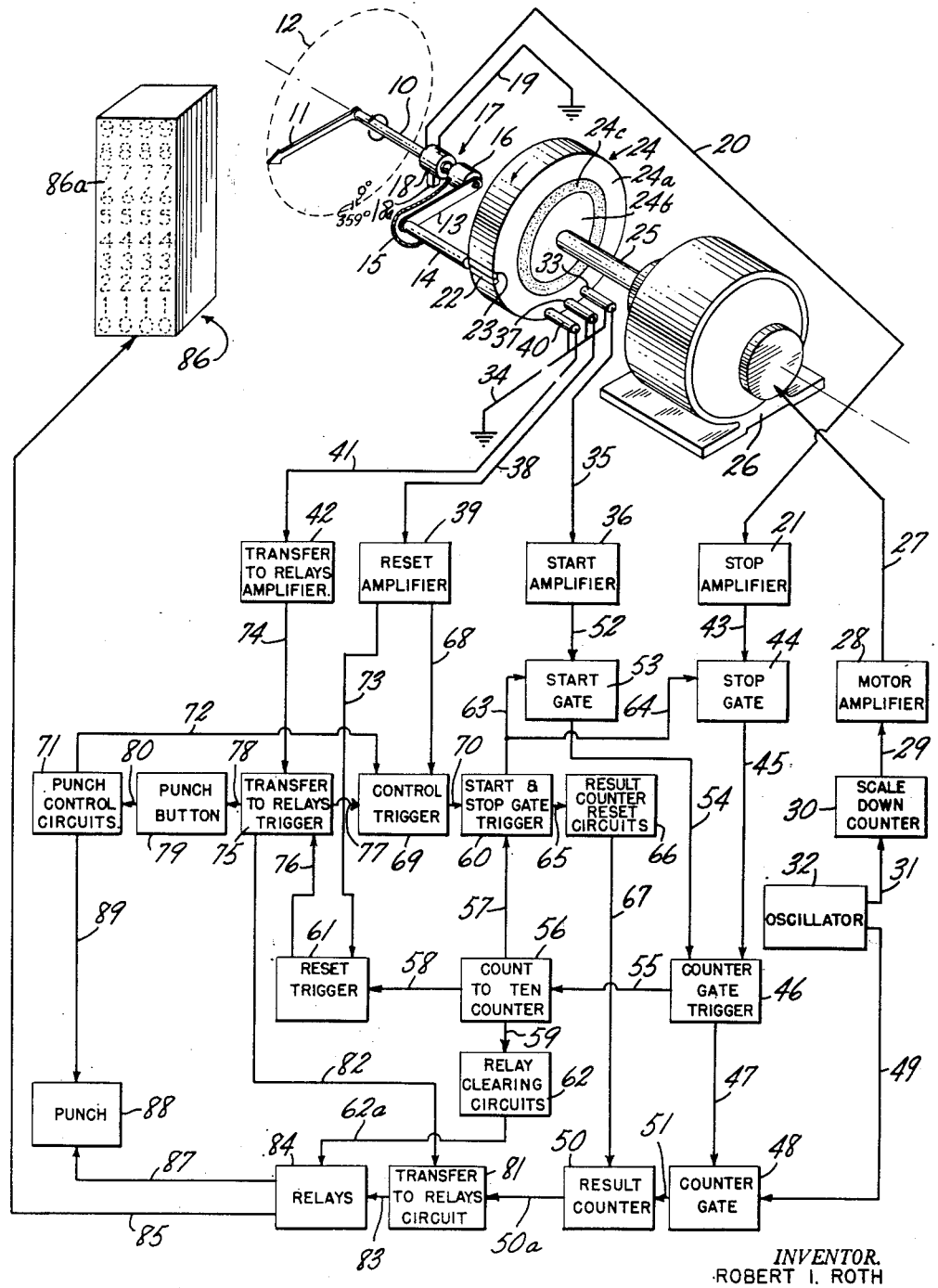
Figure 1 is a schematic circuit diagram in block form of one embodiment of the invention.

Referring to the drawings in more detail with particular reference to Figure 1, a shaft 10 is shown with a pointer 11 affixed thereto indicating rotation through an angle of less than 360° subtended by an arc represented by the broken line 12. Fastened to the other end of the shaft 10 is an arm 13 carrying a stop pickup coil 14, which preferably consists of a conventional coil wound on a core. Conductors 15 connect the coil 14 to a primary winding 16 of a transformer 17, the primary winding also being affixed to the shaft 10. Concentrically disposed about the shaft 10 is a secondary winding 18 of the transformer 17, the winding 18 being grounded through a conductor 19 and joined by a conductor 20 to second means comprising a stop amplifier 21. Although the secondary winding 18 has been shown concentric with the shaft 10, it is obvious that it could be disposed on the other side of the primary winding 16 if desired. A support 18a may be employed for positioning the winding 18 around but out of engagement with the shaft 10, it being evident that other conventional structure may be utilized for this purpose.

In order to energize the coil 14, adjacent bar magnets 22 and 23 are embedded in the rim of a flywheel 24 with a radius equal to the length of the arm 13. If it is desirable to impositively drive the magnets 22 and 23, the flywheel 24 may be formed by joining a rim section 24a and a center section 24b with a resilient section 24c formed, for example, of rubber. Due to the resilient section 24c, small variations in angular speed of the means driving the flywheel 24 will not be transmitted to the rim section 24a. It is apparent that the form of the flywheel shown is illustrative only and other structures accomplishing the same function may be employed. Furthermore, it is evident that a bar carrying the magnets 22 and 23 could be substituted for the flywheel 24.

The magnets 22 and 23 are preferably mounted with the north pole of one adjacent to the south pole of the other. The clearance between the ends of the magnets 22 and 23 and the end of the core of the pickup coil 14 is held to a minimum making it evident that as the crack between the magnets 22 and 23 passes the coil 14, a sharp pulse will be induced therein which will be transmitted through the conductors 15, the transformer 17 and the conductor 20 to the stop amplifier 21.

Driving the flywheel 24 through a shaft 25, positioned on the axis of the shaft 10, is a synchronous type motor 26. Power at the proper frequency for driving the motor 26 is furnished through a cable 27 from a motor amplifier 28, controlled by an oscillator 32 through a cable 31, a scale down counter 30 and a cable 29. Thus, the speed of the motor 26 is determined by the frequency of the oscillator 32 and the scale down counter 30.

Also positioned in any desired manner adjacent the flywheel 24 and periodically influenced by the magnets 22 and 23 are pickup coils 33, 37 and 40 joined to a grounded conductor 34 and connected by conductors 35, 38 and 41 to a start amplifier 36, a reset amplifier 39 and a transfer to relays amplifier 42, respectively. It will be understood, of course, that these amplifiers are provided with conventional ground circuits which are not shown or described for simplicity.

The structure (not shown) for positioning the pickup coils 33, 37 and 40 adjacent to the flywheel 24 should permit their adjustment through a small angular distance about the axis defined by the shafts 10 and 25. Furthermore, the motor 26 should also be provided with adjustable means to permit alignment of the shaft 25 with the shaft 10.

It is apparent that as the flywheel 24 is rotated by the motor 26 in the direction indicated by the arrow thereon, pulses will be generated in the pickup coils. Assuming that such rotation commences with the magnets 22 and 23 adjacent the start coil 33, start, stop, transfer to relays and reset pulses will be sequentially generated.

Examining the control circuits shown in Figure 1 in detail, stop pulses generated in the pickup coil 14 are coupled through the transformer 17, the conductor 20, the stop amplifier 21, a conduit 43, a stop gate 44 and a conduit 45 to a counter gate trigger 46. Circuits that may be employed for the stop gate 44 and the counter gate trigger 46 are shown in detail in Figure 2 and will be described hereinafter. For example, the stop gate 44 may consist of a conventionally connected vacuum tube with two grids, one of the grids being selectively biased to control the amplification of signals applied to the other of the grids. Further, the counter gate trigger 46 may comprise a conventional bistable multivibrator which will inherently furnish a plurality of biasing voltages depending upon its state of operation. However, it should be understood that any conventional circuitry commonly employed to accomplish gating and triggering functions may also be utilized.

Through a conduit 47 the counter gate trigger 46 controls a counter gate 48 receiving output signals from the oscillator 32 through conductor means 49. The output signals are selectively coupled by the gate 48 and a conduit 51 to a result counter 50 which may comprise conventional counting circuits. An exemplary type counter is described in connection with Figure 3.

Start pulses received by the start amplifier 36 from the start pickup coil 33 and the conductor 35 are applied through a conduit 52, a start gate 53 and conductor means 54 to the counter gate trigger 46. Simultaneously with a change caused by a stop pulse in the operating condition of the trigger 46, a pulse is applied through a cable 55 to a count to ten counter 56 of a conventional design. Thus, the counter 56 may comprise a ring counter which, after receiving nine pulses, will be reset to zero upon the tenth pulse and simultaneously generate an output pulse for influencing, respectively, through conduits 57, 58 and 59, first means comprising a start and stop gate trigger 60, a reset trigger 61 and relay clearing circuits 62, in turn joined by a cable 62a to relays 84.

The start and stop trigger 60 is connected by conductor means 63 and 64 to control the start gate 53 and the stop gate 44, respectively, and is also joined by a conduit 65 to result counter reset circuits 66, in turn connected by conductor means 67 to the result counter 50.

Reset pulses received by the reset amplifier 39 from the reset pickup coil 37 are fed through a cable 68 to fifth means comprising a control trigger 69, controlling the start and stop gate trigger 60 through a conduit 70. Furthermore, the reset pulses are fed through a conduit 73 to control a reset trigger 61.

The amplifier 42 receives transfer to relays pulses from the pickup coil 40 and couples them to third means comprising a transfer to relays trigger 75 through a conduit 74. The operation of the trigger 75 is also controlled by pulses coupled from the reset trigger 61 by a cable 76 and in turn, the trigger 75 controls both the control trigger 69 through a conduit 77 and punch control circuits 71 through a conduit 78, a punch button 79 and a conduit 80. Also connected to the transfer to relays trigger 75 by a cable 82 is fourth means comprising a transfer to relays circuit 81, described in greater detail in connection with Figure 3. The circuit 81 selectively transfers the information found in the result counter 50 through the conduits 50a and 83 to relays 84, also further described in connection with Figure 3. The relays 84 control an indicator 86 through a cable 85 and also control a conventional punch 88 through a conduit 87, the punch 88 being placed in operative condition by the punch control circuits 71 through conductor means 89. The punch control circuits, when operative, also prevent operation of the trigger 69 through a conduit 72.

As shown in Figure 1, the indicator 86 includes a mask 86a carrying four columns of outlined digits 0 to 9, and a lamp positioned adjacent to each of the digits selectively energized by the relays 84 to display the information obtained from the result counter 50.

Figure 2:
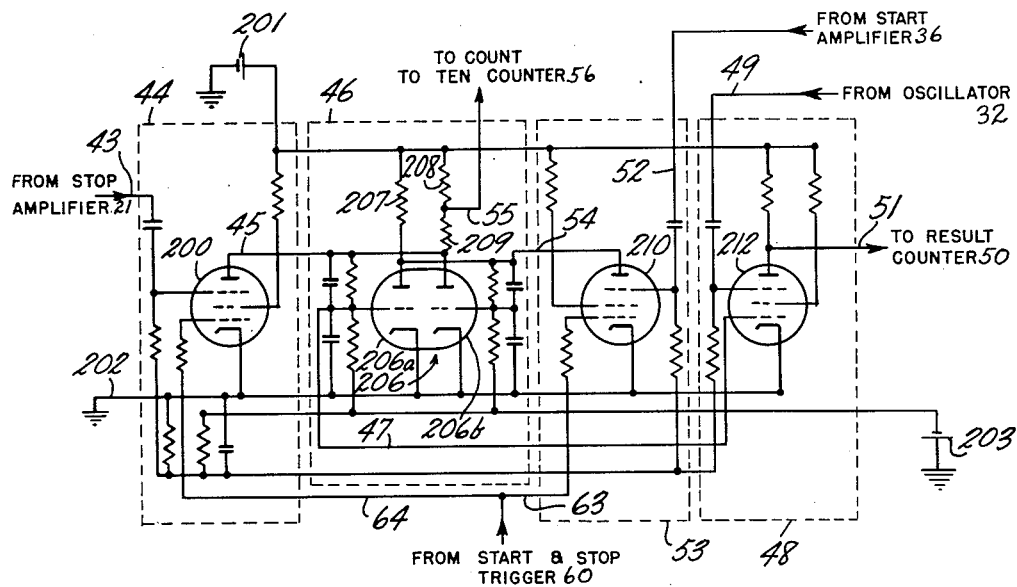
Figure 2 is a schematic circuit diagram of a portion of the circuit shown in block form in Figure 1.

As an example of the type of trigger and gate circuits that may be employed in the invention, circuits adapted for use in the stop gate 44, the counter gate trigger 46, the start gate 53 and the counter gate 48 are shown in detail in Figure 2, each of these circuits being enclosed by broken lines with their connections to the remaining circuit units being indicated by appropriate legends.

The stop gate 44 may comprise a pentode 200 having its electrodes properly biased by connections to a positive source of potential 201, a ground conductor 202, and a negative source of potential 203 in a conventional circuit arrangement. The control grid of the pentode 200 is connected to the conductor 64 leading to the start and stop trigger 60 while the suppressor grid is coupled to the conductor 43 leading to the stop amplifier 21. Thus, when pulses are applied to the suppressor grid through the conductor 43 and the control grid is suitably biased, such pulses will appear on the conductor 45 joined to the plate of the pentode 200 and leading to the counter gate trigger 46.

A dual triode 206, including a triode section 206a having a plate resistor 207 and a triode section 206b having plate resistors 208 and 209, with the conduit 55 connected to their juncture, is connected as a conventional plate to grid coupled bistable multivibrator to form the counter gate trigger 46. In this well known circuit, completely described on page 164 in vol. 19 of the Radiation Laboratory Series entitled "Waveforms," published in 1949 by McGraw-Hill Book Company, a stable condition will occur with either triode conducting.

It is common practice in describing the operation of bistable multivibrators employed as triggers to refer to an "on" and an "off" condition corresponding to conduction of the left hand triode and the right hand triode, respectively. In order to turn the counter gate trigger 46 "off," a positive stop pulse is applied to the stop gate 44. Since the plate of the triode 206b is connected to the conductor 45, conduction of the pentode 200 causes a flow of current through the plate resistors 208 and 209 which reduces the potential of the plate of the triode 206b and the grid of the section 206a. Consequently, conduction will be shifted from the triode section 206a to the triode section 206b and the trigger will be in its "off" status. In this operation, it is apparent that current flow through the resistors 208 and 209 will result in a negative pulse on the conduit 55 which causes the entry of one count on the count to ten counter 56 (Fig. 1).

The plate of the triode 206a is joined to the conductor 54 leading from the start gate 53, similar to the stop gate 44 and comprising a pentode 210 conventionally connected as indicated in the description of the pentode 200. Positive pulses from the start amplifier 36 are coupled through the conductor 52 to the suppressor grid of the pentode 210 and cause conduction through the resistor 207 if the control grid of the tube 210 is properly biased by the start and stop trigger circuit 60 through the conductor 63. Such conduction through the resistor 207 causes a drop in potential at the plate of the triode 206a and at the grid of the triode 206b resulting in a further shift of the trigger 46 to its "on" status.

It is evident that the potential of the grid of the triode section 206a will vary according to the status of the trigger 46. Accordingly, this potential is employed to control the counter gate 48 through the conductor 47.

The counter gate 48 also comprises a conventional pentode 212 operating as described in connection with the pentode 200. Signals from the oscillator 32 are furnished to the suppressor grid of the tube 212 through the cable 49, and such signals are coupled to the conductor 51 leading to the result counter 50 when the conductor 47 suitably biases the control grid, this being the case when the counter gate trigger 46 is "on," i. e., the triode 206a is conducting.

It will be understood that the remaining gate and trigger circuits may be similar to the above-described circuits in both construction and operation. However, if desired, other conventional trigger and gate circuits may be employed in either the above-described circuits or the remaining circuits, the exact construction thereof forming no part of the present invention.

Figure 3:
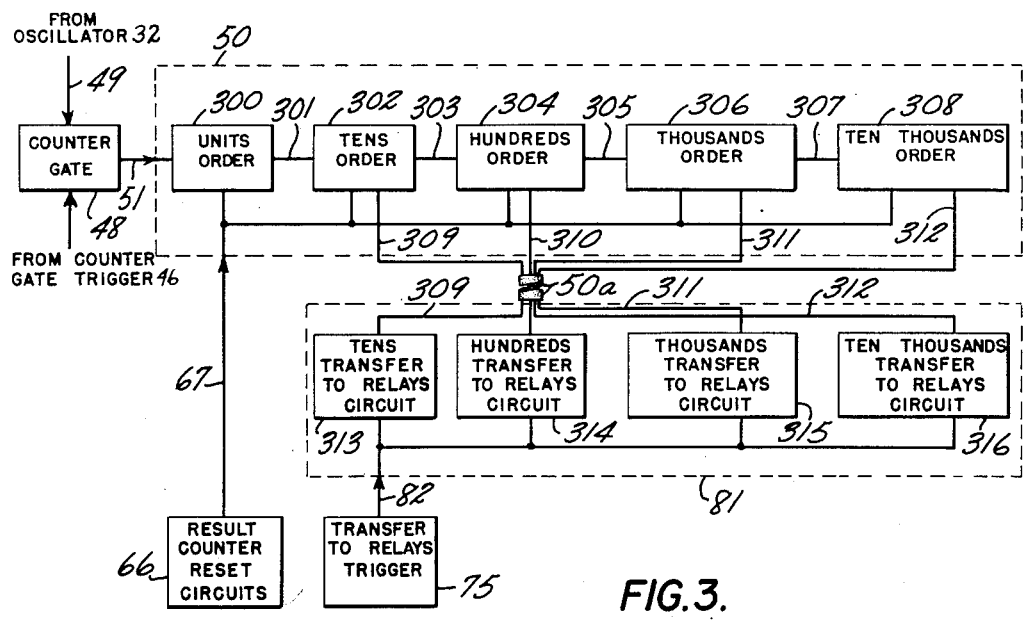
Figure 3 is a schematic circuit diagram in block form of certain of the circuits found in Figure 1.

Turning to Figure 3, circuitry is illustrated that may be employed in the result counter 50 and the circuits associated therewith. Signals from the oscillator 32 are fed through the conduit 49, the gate 48 and the conduit 51 to the result counter 50, shown enclosed by broken lines and including a plurality of counters for the various orders employed. Thus, the conduit 51 leads to a units order counter 300, tied by a cable 301 to a tens order counter 302. In turn, the tens order counter 302 is tied by a cable 303 to a hundreds order counter 304, connected to a conduit 305 leading to a thousands order counter 306, tied by a conduit 307 to a ten thousands order counter 308. Each of these order counters preferably comprises a conventional scale of ten counter built up from cascaded scale of two multivibrator circuits. Such scale of ten counters establish a decade counting system and are well known in the art. For a more detailed description of such counters, reference may be made to page 611 in vol. 19 of the Radiation Laboratory Series entitled "Waveforms," published in 1949 by the McGraw-Hill Book Company. Thus, for each ten pulses received by the units order counter 300, a pulse will be transmitted through the cable 301 to the tens order counter 302, and after ten pulses have been received thereby, one pulse will be delivered to the hundreds order counter 304 through the cable 303, this action continuing to the remaining order counters.

Respectively connected to the tens order counter 302, the hundreds order counter 304, the thousands order counter 306 and the ten thousands order counter 308 by conductors 309 to 312, inclusive, through the cable 50a are tens transfer to relays circuit 313, hundreds transfer to relays circuit 314, thousands transfer to relays circuit 315 and ten thousands transfer to relays circuit 316.

Information is conventionally read out of counters employing bistable multivibrators to form the basic scale of two circuits by determining which one of the two sections thereof is conducting. Of course, such information indicates the number of signals received by the counter circuits. As an illustration of how such information may be read from the counters in the present instance, each of the transfer to relays circuits 313 to 316, inclusive, may comprise a plurality of control tubes corresponding to the number of multivibrators in the associated order counters, and the grids of such control tubes may be joined to the grid of one triode of each multivibrator. The relays 84 (Figure 1) may be disposed in the plate circuits of the control tubes through the conduit 83. Accordingly, certain relays will be energized in accordance with the information found in the result counter 50 due to conduction of their associated control tubes. It will be understood that the invention is not limited to this type of reading out circuitry since other conventional means may be utilized.

In order to obtain the information accumulated in the result counter 50 at a predetermined time, the transfer to relays circuit 81, shown in broken outline in Figure 3, is controlled by a signal received through the conductor means 82 from the transfer to relays trigger 75. Such signal may unblock the control tubes, if they are employed, to permit the energization of certain of the relays associated therewith.

After the information has been read from the result counter 50, it becomes necessary to reset it for further operation. In this instance, the counter 50 is reset a predetermined number of counts below zero, for reasons to be explained in detail hereinafter. In order to provide such resetting action, a signal from the result counter reset circuits 66 is applied through the conductor 67 to the result counter 50 and to each of the order counters therein thereby effectively resetting such order counters. Such resetting may be accomplished by placing a positive bias on suitable grids of the multivibrator sections to cause conduction thereof.

In considering a typical operation of this embodiment of the invention, it will be assumed that a counting cycle is initiated with the following conditions prevailing in the circuit of Figure 1. The counter gate trigger 46 is "off" and holding the counter gate 48 closed, the start and stop trigger 60 is "off" and holding the stop and start gates 44 and 53 open, the count to ten counter 56 is at zero, the transfer to relays, reset and control triggers 75, 61 and 69 are "off," and the result counter 50 has been reset to a predetermined number of counts below zero. Assuming next that the flywheel 24 sweeps the bar magnets 22 and 23 past the start pickup coil 33, the resulting start pulse will be coupled through the start amplifier 36, the open start gate 53 and the cable 54 to turn "on" the counter gate trigger 46, resulting in the opening of the counter gate 48. Accordingly, signals from the oscillator 32 will be fed to the result counter 50 through the cable 49, the counter gate 48 and the cable 51.

The result counter 50 will accumulate signals during the interval necessary for the magnets 22 and 23 to be rotated to the stop pickup coil 14 where a stop pulse is generated. The stop pulse will be fed through the conductors 15, the transformer 17, the conductor 20, the stop amplifier 21, the cable 43, the open stop gate 44 and the cable 45 to turn "off" the counter gate trigger 46 which closes the counter gate 48. As the counter gate trigger 46 is shifted from the "on" to the "off" condition, a pulse is generated which is applied through the conduit 55 to the count to ten counter 56.

As the magnets 22 and 23 are rotated further by the flywheel 24, they sweep past the transfer to relays pickup coil 40 and the reset pickup coil 37 and corresponding pulses will be generated. The transfer to relays pulse will attempt to turn the transfer to relays trigger 75 "off" through the conductor 41, the transfer to relays amplifier 42 and the cable 74. However, since the trigger 75 is "off," the pulse will be ineffectual to initiate any function. Similarly, the reset pulse will be applied through the conductor 38, the reset amplifier 39, and the conduit 73 to the reset trigger 61, and through the cable 68 to the control trigger 69 which will not be affected since they, too, are in an "off" status.

Accordingly, as the magnets 22 and 23 again sweep past the start pickup coil 33, the action described above will again occur and the counter gate 48 will open for the interval the bar magnets 22 and 23 sweep from the start pickup coil 33 to the stop pickup coil 14. This action is repeated ten times, and each of these times a pulse is applied to the count to ten counter 56 as described above.

As the tenth pulse is fed to the count to ten counter 56, it counts from 9 to 0 and in doing so, generates a pulse which is applied through the cable 57 to turn the start and stop gate trigger 60 "on," through the cable 58 to turn the reset trigger 61 "on," and through the cable 59 to initiate the operation of the relay clearing circuits 62.

The shift of the start and stop gate trigger 60 to the "on" status closes the start gate 53 and the stop gate 44 by the application of a negative bias through the conduits 63 and 64, respectively, so that pulses applied to the stop and start amplifiers 21 and 36 will not be received by the counter gate trigger 46.

The pulse from the count to ten counter 56 that is applied through the conductor means 58 turns the reset trigger 61 "on." Accordingly, the reset pulse generated towards the end of the tenth revolution of the flywheel 24 is coupled through the conductor 38, the reset amplifier 39 and the conduit 73 to turn the reset trigger 61 "off," this shift being accompanied by the generation of a pulse that is applied through the conduit 76 to turn the transfer to relays trigger 75 "on."

The pulse from the count to ten counter 56 that is applied to the cable 59 initiates the operation of the relay clearing circuits 62 which deenergize through the conduit 62a any relays operated in a previous cycle.

In the eleventh revolution of the flywheel 24, the movement of the magnets 22 and 23 past the transfer to relays pickup coil 40 generates a pulse which is applied through the conductor 41, the transfer to relays amplifier 42 and the conduit 74 to turn the transfer to relays trigger 75 "off." This shift in operation results in the generation of a pulse which is coupled through the conduit 77 to turn "on" the control trigger 69 and through the conduit 82 to energize the transfer to relays circuit 81. Accordingly, the information in the result counter 50 is read out and transferred through the cable 50a, the circuit 81 and the cable 83 to energize certain of the relays 84. Through the cable 85, individual lamps in the lamp bank 86 are controlled by the relays 84 and display in digital form a number indicative of the position of the shaft 10.

In the event it is desirable to record the digital information on a punch card, the punch button 79 is operated to connect the transfer to relays trigger 75 to the punch control circuits 71. Subsequently, the pulse generated as the transfer to relays trigger 75 is turned "off" by the transfer to relays pulse is coupled through the conduit 78, the punch button 79 and the conduit 80 to initiate operation of the punch control circuits 71. As such operation is initiated, a bias voltage is applied through the cable 72 to hold the control trigger 69 in its "on" status until the punch circuits complete their cycle. While the control trigger 69 is held "on," reset pulses applied thereto will have no effect.

The punch control circuits 71 cause functioning of the punch 88 through the conduit 89, the punch 88 operating in accordance with the information contained in the relays 84 coupled through the conduit 87. If a conventional punch and tabulating card is employed, as the last entry on the card is punched, the bias is removed from the conduit 72 and the system resumes normal operation as set forth hereinafter.

In the eleventh revolution of the flywheel 24, or in the revolution after completion of the punching operation, the magnets 22 and 23 will sweep past the reset pickup coil 37 and the resultant pulse will be applied through the conductor 38, the reset amplifier 39 and the cable 68 to turn the control trigger 69 "off."

This operation results in the generation of a pulse which is coupled through the cable 70 to turn the start and stop trigger 60 "off." Consequently, the start and stop gates 53 and 44 are opened through the conductor means 63 and 64. Simultaneously, a pulse generated by the shift of the start and stop control trigger 60 to its "off" status is applied through the conduit 65 to energize the result counter reset circuits 66 which function through the conduit 67 to reset the result counter 50 to a predetermined number below zero. If desired, the pulse generated as the control trigger 69 is turned "off" may be applied to both the start and stop trigger 60 and the result counter reset circuits 66, omitting the conduit 65.

To insure proper operation of the system, it is necessary to reset the counter 50 to a predetermined number of counts below zero to compensate for the signals accumulated between the position of the start pickup coil 33 and the true zero position of the shaft 10. The reason that the start coil 33 should not be placed at the true zero position of the shaft 10 is obvious, since such an arrangement would, in instances when the shaft 10 has not been rotated, permit simultaneous generation of start and stop pulses which might result in erroneous operation of the counter gate trigger 46. Thus, the counter 50 is reset to a value below zero ten times the number of counts received during the aforementioned interval, since ten revolutions occur before the information is read out of the result counter 50.

As already indicated, ten readings are applied to the result counter before the information therein is read to the relays 84 by the transfer to relays circuit 81. This manner of operation provides for a simple averaging of the results for accuracy. Thus, as can be seen in Figure 3, information is not read out of the units order counter 300 but is read out of the remaining orders. By functioning in this manner and moving the decimal point one place to the left, a simple averaging of the results is accomplished.

Since the rate of rotation of the flywheel 24 and the signals fed into the result counter 50 are directly related to the frequency of the oscillator 32, it is apparent that by providing the proper count down values in the scale down counter 30, any predetermined increment of angular movement may be made equivalent to a unit digit. For example, it can be assumed that one degree of angular movement of the shaft 10 from its zero position is equivalent to one unit of something which could be weight, voltage, current or other quantity to be measured. Therefore, in this example if the shaft 10 moved 10° from its zero position, this movement would be translated to the form of the digit 10. Such translation would occur up to an angular movement of 359° which would be indicated by the number 359. It will be understood that these values are illustrative only, and that any desired increment of angular movement greater or less than a degree may be selected to equal a unit digit. Obviously, the smaller the increment, the greater will be the accuracy of the system.

It may be desirable in certain instances to provide apparatus other than the rotating magnets and pickup coils for generating the various control pulses. For example, an optical system capable of generating such pulses is shown in Figure 4. The shaft 10, adapted to be rotated through an angle less than 360°, has affixed to the end thereof a bar 400 carrying at one end a mirror lens assembly 401 including a suitably mounted focusing lens 402 and a mirror 403 supported at an angle of 45° to the axis of the shaft 10. Also provided in the assembly 401 is a plate 404 having a slit 405 therein designed to pass a narrow slit of light to the mirror 403 as indicated by the arrows. An aperture 406 is formed in the assembly 401 to permit light to be reflected by the mirror 403 to a mirror 407, also disposed at a 45° angle to the shaft 10.

The mirror 407 is supported by a block 408 affixed to the bar 400 in any convenient manner. Disposed adjacent to the mirror 407 is a photocell 409 adapted to receive light from the mirror and supported in any desired manner. Conductors 409a and 409b are joined to the photocell 409 and lead to suitable circuits (not shown) for amplifying the voltage pulses received therefrom and applying them to the stop amplifier 21 (Figure 1). A weight 410 may be provided on the other end of the bar 400 to counterbalance the shaft 10.

In order to obtain pulses indicative of the position of the bar 400 and consequently the shaft 10, a motor 26' similar to the motor 26, is energized from a conduit 27', which may lead to the same circuit components as the conduit 27 in Figure 1. The motor 26' may be supported by brackets 411 joined thereto and fastened to a base 412. A shaft 413, positioned on the same axis as the shaft 10 and extending from either end of the motor 26', rotates bars 414 and 415 affixed thereto in any conventional manner. One end of the bar 414 carries a counterbalance 414a while a lens mirror assembly 416 is affixed to the other end. The assembly 416 includes a mirror 417 mounted at an angle of 45° to the axis of the shaft 413 and receiving light rays through an opening 418 formed in the assembly 416. The mirror 417 reflects the light rays through a pair of suitably mounted focusing lenses 419 and 420 to the assembly 401, as indicated by the arrows.

Also mounted on the bar 414 is a second lens mirror assembly 421 with an aperture 422 formed therein and including a mirror 423 disposed at a 45° angle to the axis of the shaft 413. An appropriately mounted lens 424 in the assembly 421 cooperates with a light source 425 to focus light rays on the mirror 423. The light source 425 may be an incandescent lamp, an arc or any other convenient source of light, and is mounted adjacent to the assembly 421 in any desired manner. A plate 426a is fastened to the base 412 to shield the photocell 409 from direct light radiated by the source 425.

Also mounted on the bar 414 between the assemblies 416 and 421 is a plate 426 having a slit 427 therein adapted to pass light rays from the mirror 423 to the mirror 417. For convenience in illustrating the slits 405 and 427, they have been rotated 90° from their preferred orientation.

Turning next to the bar 415, a counterweight 428 is positioned on one end thereof while a mirror lens assembly 429 is affixed to the other end. The assembly 429 includes a mirror 430 supported at an angle of 45° to the shaft 413 and a pair of appropriately mounted focusing lenses 431 and 432. Also formed in the lens assembly 429 is an opening 433 permitting light from a further assembly 434 to impinge on the mirror 430. The assembly 434, having an aperture 435 formed therein, is mounted on the bar 415 on the axis of the shaft 413 and consists of a mirror 436 mounted at a 45° angle to the shaft 413 and a lens 437 cooperating to focus light rays indicated by the arrows from an incandescent lamp or other suitably supported light source 438. Also mounted on the bar 415 between the assemblies 429 and 434 is a plate 439 with a slit 440 therein adapted to pass a narrow beam of light.

Referring to Figures 4 and 5, disposed on the base 412 is an angle iron 440 upon which three plates 441, 442 and 443 having slits 444, 445 and 446 formed therein, respectively, are mounted. These plates are adjustably mounted by slots 447, 448 and 449 thereon which receive wing nut and bolt assemblies 450, 451 and 452. It should be noted that for clarity of illustration, the slit 440 has been rotated 90° from the position necessary for the beam of light passing therethrough to properly impinge on the slits 444, 445 and 446.

Mounted adjacent to each of the slots 444, 445 and 446 are photocells 453, 454 and 455 adapted to receive light rays and generate pulses each time the assembly 429 sweeps past.

In the operation of the apparatus shown in Figures 4 and 5, as the shaft 413 is rotated by the motor 26', light from the source 425 is focused by the lens 424 and reflected by the mirror 423 through the slit 427 to the mirror 417 where it is further reflected through the focusing lenses 419 and 420. Each time the assembly 416 sweeps past the assembly 401, light rays pass through the slit 405 and the lens 402 and are reflected by the mirrors 403 and 407 to the photocell 409 resulting in the generation of a voltage pulse between the conductors 409a and 409b. It is evident that this pulse will be indicative of the position of the shaft 10 and corresponds to the stop pulse generated in the stop pickup coil 14 (Figure 1).

Light rays provided by the source 438 are focused by the lens 437 and reflected by the mirror 436 through the slit 440 to the mirror 430. The light rays reflected from the mirror 430 are focused by the lenses 431 and 432 and pass through the slits 444, 445 and 446 to energize the photocells 453, 454 and 455 during each rotation of the shaft 413. Accordingly, pulses equivalent to the transfer to relays, reset and start pulses, described in connection with Figure 1, will be generated and may be applied by appropriate circuits (not shown) to the transfer to relays amplifier 42, the reset amplifier 39 and the start amplifier 36 (Figure 1).

If desirable, the assembly illustrated in Figure 5 may be disposed so that light rays from the assembly 416 will impinge thereon for generating the control pulses. In this instance, the arm 415 and the apparatus associated therewith could be eliminated.

Accordingly, methods and apparatus for accurately indicating the position of a shaft rotating less than 360° have been provided. It will be understood that the above-described embodiments of the invention are illustrative only and modifications will occur to those skilled in the art. For example, other electro-mechanical and optical systems similar to those described may be employed for generating the various control pulses. Further, other conventional counters and means for reading out the information contained in such counters may be substituted for certain of the above-described circuits. Therefore, the invention is not to be limited to the specific apparatus disclosed herein but is to be defined by the appended claims.

I claim:

1. Apparatus for measuring the angular movement of a shaft from a zero position comprising signal generating means, means operating synchronously with said signal generating means for generating first, second, third and fourth pulses, said first and second pulses being separated by a time interval indicative of the angular movement of said shaft, counting means, gating means for selectively coupling said signal generating means to said counting means, said gating means normally being opened by said first pulse and closed by said second pulse, control means conditioned by the reception of a predetermined number of said first and second pulses and a subsequent one of said fourth pulses to be responsive to one of said third pulses for obtaining information from said counting means, and resetting means conditioned by the operation of said control means to be responsive to another of said fourth pulses for resetting said counting means.

2. Apparatus as defined in claim 1 wherein said control means includes relays selectively actuated by said counting means for energizing lamps in an indicator.

3. Apparatus as defined in claim 1 wherein said resetting means resets said counting means to a predetermined number of counts below zero.

4. Apparatus for measuring the angular movement of a shaft from a zero position comprising signal generating means, a device disposed on said shaft and moving therewith, stationary means positioned in the vicinity of said shaft, rotating means operating synchronously with said signal generating means for scanning said device and said stationary means, said rotating means cooperating with said device and said stationary means to generate first, second and third pulses during each revolution of said rotating means, said first and second pulses being separated by a time interval indicative of the angular movement of said shaft, counting means, gating means for selectively coupling said signal generating means to said counting means, said gating means normally being opened by said first pulse and closed by said second pulse, and control means conditioned by the reception of a predetermined number of said first and second pulses to be responsive to said third pulse for obtaining information from said counting means.

5. Apparatus for measuring the angular movement of a shaft from a zero position comprising signal generating means, a device disposed on said shaft and moving therewith, stationary means positioned in the vicinity of said shaft, rotating means operating synchronously with said signal generating means for scanning said device and said stationary means, said rotating means cooperating with said device and said stationary means to generate first, second, third and fourth pulses during each revolution of said rotating means, said first and second pulses being separated by a time interval indicative of the angular movement of said shaft, counting means, gating means for selectively coupling said signal generating means to said counting means, said gating means normally being opened by said first pulse and closed by said second pulse, first control means conditioned by the reception of a predetermined number of said first and second pulses to be responsive to one of said fourth pulses for conditioning second control means to be responsive to one of said third pulses for obtaining information from said counting means, and resetting means conditioned by the operation of said second control means to be responsive to another of said fourth pulses for resetting said counting means.

6. Apparatus as defined in claim 5 wherein said resetting means resets said counting means to a predetermined number of counts below zero.

7. Apparatus for measuring the angular movement of a shaft from a zero position comprising means mounted on said shaft for carrying a first pickup coil, a second pickup coil disposed in the vicinity of said shaft, means for rotating magnetic field generating means to induce stop and start voltage pulses indicative of the angular movement of said shaft in said first and second pickup coils, third and fourth pickup coils for generating transfer and reset voltage pulses subsequent to said start pulse in response to rotation of said magnetic field generating means, signal generating means operating synchronously with said rotating means, counting means, gating means for selectively coupling said signal generating means to said counting means, said gating means normally being opened by said start pulse and closed by said stop pulse, control means conditioned by the reception of a predetermined number of said start and stop pulses and a subsequent one of said reset pulses to be responsive to said transfer pulse to obtain information from said counting means, and means conditioned by the operation of said control means to be responsive to another of said reset pulses for resetting said counting means.

8. Apparatus for measuring the angular movement of a shaft from a zero position comprising means mounted on said shaft for carrying a first pickup coil, a second pickup coil positioned to have a predetermined angular relation to said first coil with said shaft at the zero position, means for rotating magnetic field generating means in a path defined by said first and second coils to induce therein stop and start voltage pulses indicative of the angular movement of said shaft, third and fourth pickup coils positioned in the path of the rotating magnetic field means to generate transfer and reset voltage pulses subsequent to said start pulse, signal generating means operating synchronously with said rotating means, counting means, gating means for selectively coupling said signal generating means to said counting means, said gating means normally being opened by said start pulse and closed by said stop pulse, first control means conditioned by the reception of a predetermined number of said start and stop pulses to be responsive to a subsequent one of said reset pulses for conditioning second control means to be responsive to said transfer pulse for obtaining information from said counting means, and means conditioned by the operation of said second control means to be responsive to another of said reset pulses for resetting said counting means.

9. Apparatus for measuring the angular movement of a shaft from a zero position comprising signal generating means, means operating synchronously with said signal generating means for generating first, second, third and fourth pulses, said first and second pulses being separated by a time interval indicative of the angular movement of said shaft, counting means, gating means for selectively coupling said signal generating means to said counting means, control means responsive to said first pulse for opening said gating means and responsive to said second pulse for closing said gating means, means responsive to a predetermined number of cycles of said control means for generating a fifth pulse, first means responsive to said fifth pulse for rendering said control means unresponsive to said first and second pulses, second means conditioned by said fifth pulse to be responsive to one of said fourth pulses for conditioning third means to be responsive to one of said third pulses for rendering fourth and fifth means operative, said fourth means operative to transfer information in said counting means to indicating means, said fifth means responsive to another of said fourth pulses for rendering said control means responsive to said first and second pulses and for resetting said counting means.

10. Apparatus as defined in claim 9 wherein said indicating means includes indicator lamps, and said fourth means includes relays controlling said lamps, said relays being selectively energized by said counting means for energizing the indicator lamps associated therewith.

11. Apparatus as defined in claim 9 wherein said indicating means includes punching apparatus adapted to record the information.

12. Apparatus for measuring the angular movement of a shaft from a zero position comprising means mounted on said shaft for carrying a first pickup coil, a second pickup coil positioned to have a predetermined angular relation to said first coil with said shaft at the zero position, means for rotating magnetic field generating means in a path defined by said first and second coils to induce therein stop and start voltage pulses indicative of the angular movement of said shaft, third and fourth pickup coils positioned in the path of said rotating magnetic field generating means to generate transfer and reset voltage pulses subsequent to said start pulse, signal generating means operating synchronously said rotating means, counting means, gating means for selectively coupling said signal generating means to said counting means, control means responsive to said start pulse for opening said gating means and responsive to said stop pulse for closing said gating means, means responsive to a predetermined number of cycles of said control means for generating a control pulse, first means responsive to said control pulse for rendering said control means unresponsive to said stop and start pulses, second means conditioned by said control pulse to be responsive to one of said reset pulses for conditioning third means to be responsive to one of said transfer pulses for rendering fourth and fifth means operative, said fourth means operative to transfer information in said counting means to indicating means, said fifth means responsive to another of said reset pulses for rendering said control means responsive to said start and stop pulses and for resetting said counting means.

13. Apparatus as defined in claim 12 wherein said indicating means includes indicator lamps, and said fourth means includes relays controlling said lamps, said relays being selectively energized by said counting means for energizing the indicator lamps associated therewith.

14. Apparatus as defined in claim 12 wherein said indicating means includes punching apparatus adapted to record the information.

15. Apparatus as defined in claim 12 wherein said fifth means resets said counting means to a predetermined number of counts below zero.

16. Apparatus as defined in claim 4 wherein said device on the shaft comprises means carrying light transmitting means, first light responsive means positioned to receive light from said light transmitting means, said stationary means includes second light responsive means positioned to have a predetermined angular relation to said first light responsive means with the shaft at the zero position, and said rotating scanning means comprises rotating light generating means inducing said first and second pulses indicative of the angular movement of said shaft in said second and first light responsive means.

17. Apparatus as defined in claim 1 wherein said synchronously operating means comprises means mounted on the shaft carrying light transmitting means, a first photoelectric cell positioned to receive light from said transmitting means, a second photoelectric cell positioned to have a predetermined angular relation to said first photoelectric cell with said shaft at the zero position, means for rotating light generating means to induce said first and second pulses in said second and first photoelectric cells, and third and fourth photoelectric cells positioned to generate said third and fourth pulses subsequent to said first pulse in response to reception of light from said light generating means.

18. Apparatus as defined in claim 1 wherein said synchronously operating means includes means carrying light transmitting means offset from the shaft axis, first light responsive means positioned to receive light from said light transmitting means, second light responsive means positioned to have a predetermined angular relation to said first light responsive means with the shaft at the zero position, light generating means positioned to illuminate said light transmitting means and said second light responsive means selectively, and means for rotating said light generating means so that the first and second pulses will be generated in said second and first light responsive means.

References Cited in the file of this patent

UNITED STATES PATENTS

| | | |
|---|---|---|
| 2,430,889 | Di Toro | July 9, 1946 |
| 2,680,241 | Gridley | June 1, 1954 |